United States Patent [19]

Adelson

[11] Patent Number: 4,939,515
[45] Date of Patent: Jul. 3, 1990

[54] DIGITAL SIGNAL ENCODING AND DECODING APPARATUS

[75] Inventor: Edward H. Adelson, Cambridge, Mass.

[73] Assignee: General Electric Company, Princeton, N.J.

[21] Appl. No.: 252,223

[22] Filed: Sep. 30, 1988

[51] Int. Cl.⁵ .................... H03M 7/00; H04N 11/04
[52] U.S. Cl. ........................................ 341/51; 358/13
[58] Field of Search ............... 341/51, 87; 360/32; 358/12, 13

[56] References Cited

U.S. PATENT DOCUMENTS 3,304,372  2/1967  Filipowsky et al. .
4,134,134  1/1979  Lux .................................... 341/87
4,237,484  12/1980 Brown et al. .
4,302,775  11/1981 Widergren et al. ................ 341/51
4,394,774  7/1983  Widergren et al. ................ 341/51
4,401,854  8/1983  Steele .
4,495,620  1/1985  Steele et al. .
4,580,162  4/1986  Mori .................................. 341/51

Primary Examiner—William M. Shoop, Jr.
Assistant Examiner—Sharon D. Logan
Attorney, Agent, or Firm—Joseph S. Tripoli; Peter M. Emanuel; Thomas F. Lenihan

[57] ABSTRACT

Digital data is conveyed along with the analog signal by selectively quantizing the analog signal in response to the level of each of the digital bits to be sent. By determining which quantization function was used, a decoder may recover the embedded digital data.

7 Claims, 8 Drawing Sheets

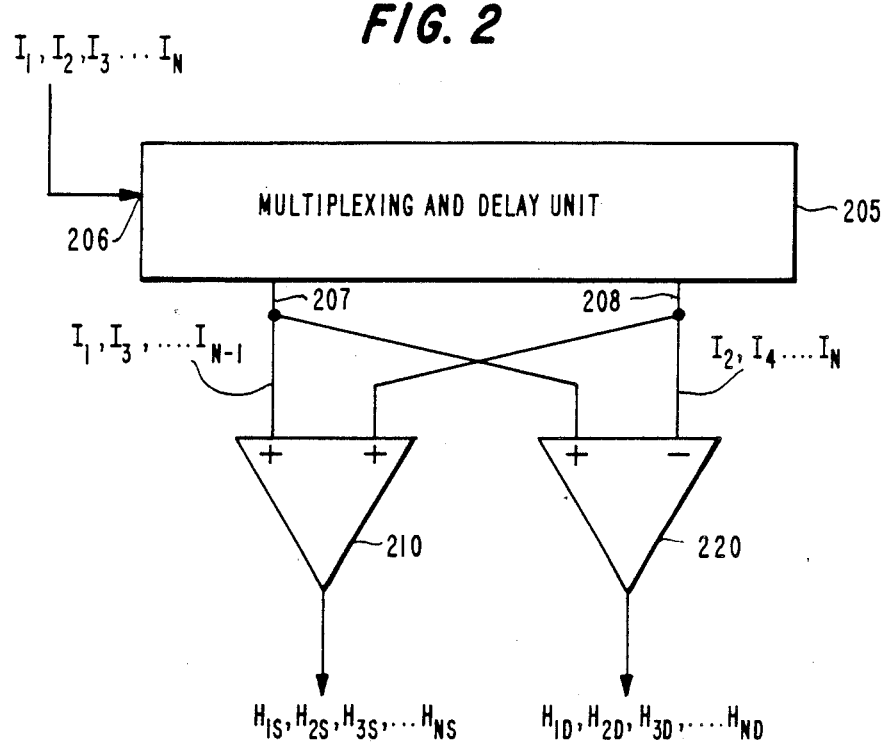

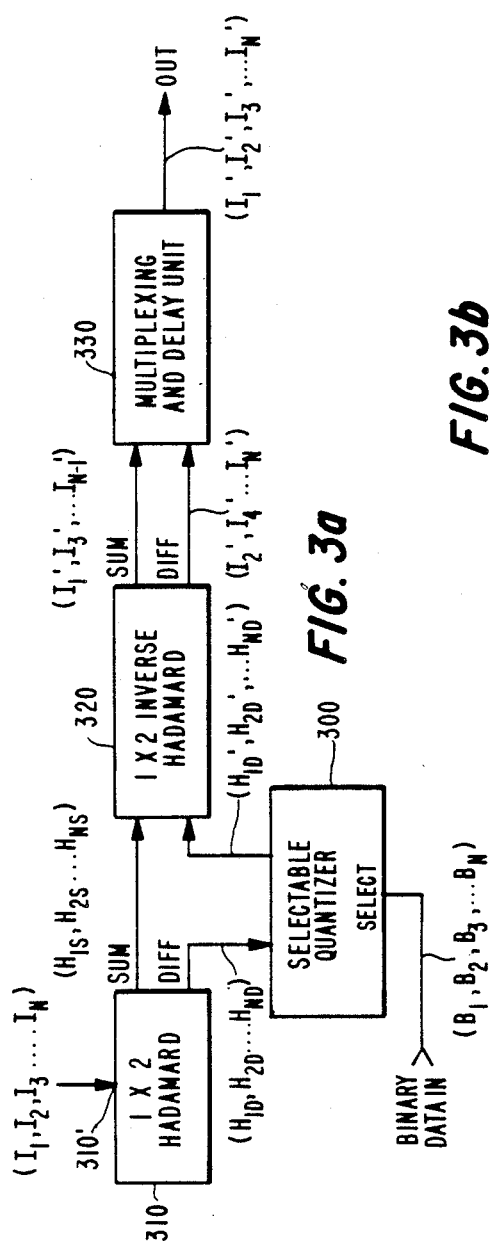
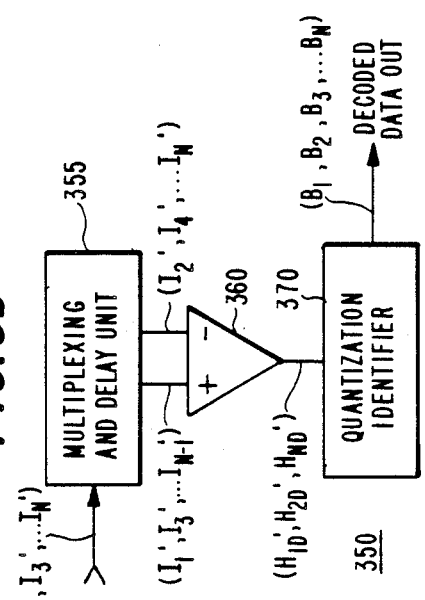
FIG. 3a
FIG. 3b

DIGITAL SIGNAL ENCODING AND DECODING APPARATUS

FIELD OF THE INVENTION

This invention relates to the field of encoding and decoding digital information.

BACKGROUND OF THE INVENTION

Emerging television (TV) technologies such as teletext, compatible high definition TV, and interactive videodisc systems often require that digital information be encoded for transmission for broadcast or recording and later decoded by a television signal processing system such as a television receiver, videodisc player or VCR. It is desirable to send the digital information over the same channels that are currently used for normal television signals. Unfortunately, most of the available information space in a standard television signal is used by the video signal itself, leaving only the horizontal and vertical blanking intervals as convenient areas for inserting digital information. However, the blanking intervals are relatively short, and consequently the amount of digital information that can be placed therein is limited. Thus, for applications such as interactive videodisc systems which utilize a relatively large amount of digital data the blanking intervals may be inadequate.

SUMMARY OF THE INVENTION

It is herein recognized that a digital signal may be "embedded" (i.e., encoded) within an analog signal by applying the analog signal to a quantizing circuit having a first and second ranges of output values offset from one another by a predetermined amount, and by applying the digital signal to be embedded to a control input of the quantizer circuit as a selection control signal for selecting either the first or second range of values.

It is further recognized herein that the embedded digital signal can be "recovered" (i.e., decoded) from the quantized signal by examining the individual samples of the quantized signal and determining which quantizing range has been applied to each sample. That is, a signal sample occupying a level of the first range of values would represent, for example, a binary zero, and a signal sample occupying a level of the second range of values would represent, for example, a binary one.

It is further recognized herein that it may be desirable to encode digital data by quantizing the Hadamard coefficients of a Hadamard transformed analog signal.

BRIEF DESCRIPTION OF THE DRAWING

FIG. 2 illustrates, partly in block diagram form and partly in schematic form, an arrangement for performing a Hadamard transform;

FIG. 3a illustrates, partly in block diagram form and partly in schematic form, an embodiment of the invention for quantizing the Hadamard coefficients of an analog signal;

FIG. 3b illustrates, partly in block diagram form and partly in schematic form, an embodiment of the invention for recovering the embedded digital data produced by the system shown in FIG. 3a;

DETAILED DESCRIPTION OF THE EMBODIMENT

Figure 1B:
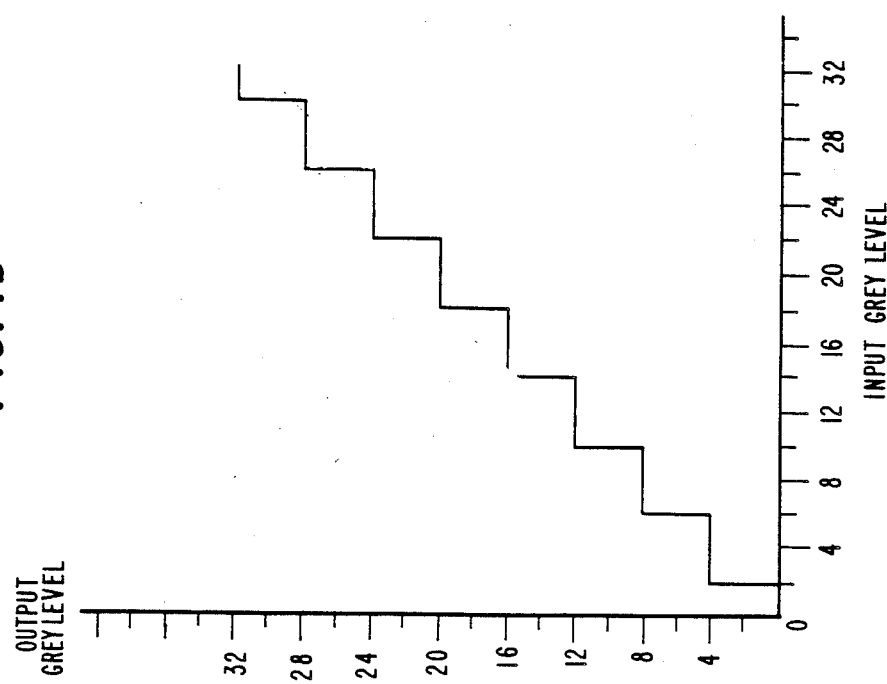
FIGS. 1a and 1b represent the ranges of output levels obtainable from a quantizer circuit having a switchable offset.

The particular embodiment to be described with reference to the FIGURES is set in a television environment.

Before describing the invention in detail, some general principals will be described.

For any given television image there exist many other television images that are, for all practical purposes, perceptually equivalent in that a human visual system simply cannot distinguish one from another. Given a pair of such perceptually indistinguishable television images, called I0 and I1 for descriptive purposes, it is possible to assign the values binary 0 to image I0 and binary 1 to the image I1. Thus, the fact that image I0 is sent implies that a binary 0 is also transmitted, while the transmission of image I1 implies that a binary 1 is also transmitted. To an observer watching the images displayed on a standard television receiver, the images would appear identical. However, in addition to receiving and displaying the image, a television receiver equipped with the decoding circuitry described below would also be able to detect which binary digit was sent along with the analog image signal.

In the above example, which is merely illustrative, the existence of two equivalent images allows the transmission of 1 bit of information per frame. However, in general, if for each image the eye can distinguish, there exist K equivalent images that can be reliably distinguished by decoding circuitry in a receiver, then there are $\log_2(K)$ bits that can be sent with each image.

The potential information content of such a hidden digital channel is quite large. This is so because the same principal described above for the entire image is applicable to each pixel, i.e., is applicable on a pixel per pixel basis.

If a pixel can have 2 values which are perceptually indistinguishable from one another, then 1 bit of digital information can be sent per pixel. If a pixel can have 4 perceptually indistinguishable values, then 2 bits of information can be sent per pixel. In general, therefore, for N indistinguishable values, $\log_2 N$ bits of digital information can be sent via the hidden digital channel. This encoding concept can also be applied to the values of transform coefficients that may be present in the transmitted picture. Thus, if a given transform coefficient can take on N different values without producing visible degradation, then $\log_2 N$ bits can be embedded in that coefficient. With the foregoing in mind, an embodiment of the invention will now be described with reference to the FIGURES.

Figure 1A:
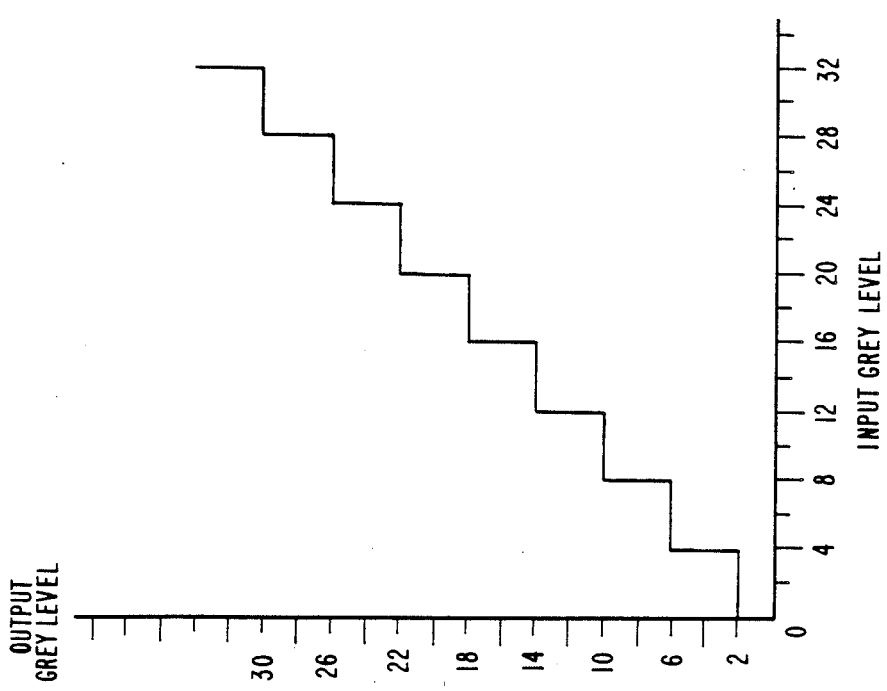

FIGS. 1a and 1b represent the possible quantization levels for two ranges of output values, respectively, for the same input signal. In FIG. 1a, the possible output values are 2, 6, 10, 14, 18, 22, 26, and 30 (on an arbitrary scale of 0–32). In FIG. 1b, the possible output values are 0, 4, 8, 12, 16, 20, 24, 28 and 32. Either quantization level may be used and will produce a recognizable image. Because there are two equally good quantization functions, it is possible to arbitrarily assign one of them to represent the transmission of a binary 0, and assign the other to represent the transmission of a binary 1.

A standard television receiver which receives such an encoded signal would simply display it in the usual way. But a television system (TV or VCR) which is equipped with the proper decoder would, in addition to processing the video signal as usual, determine which quantization function was used to encode each pixel, thereby recovering the hidden digital data. That is, if the particular pixel being examined occupied a level in the set 2, 6, 10 . . . , then it was encoded with, for example, a binary 1. However, if the particular pixel being examined occupied a level in the set {0, 4, 8, . . .} then it was encoded with a binary 0.

Figure 7:
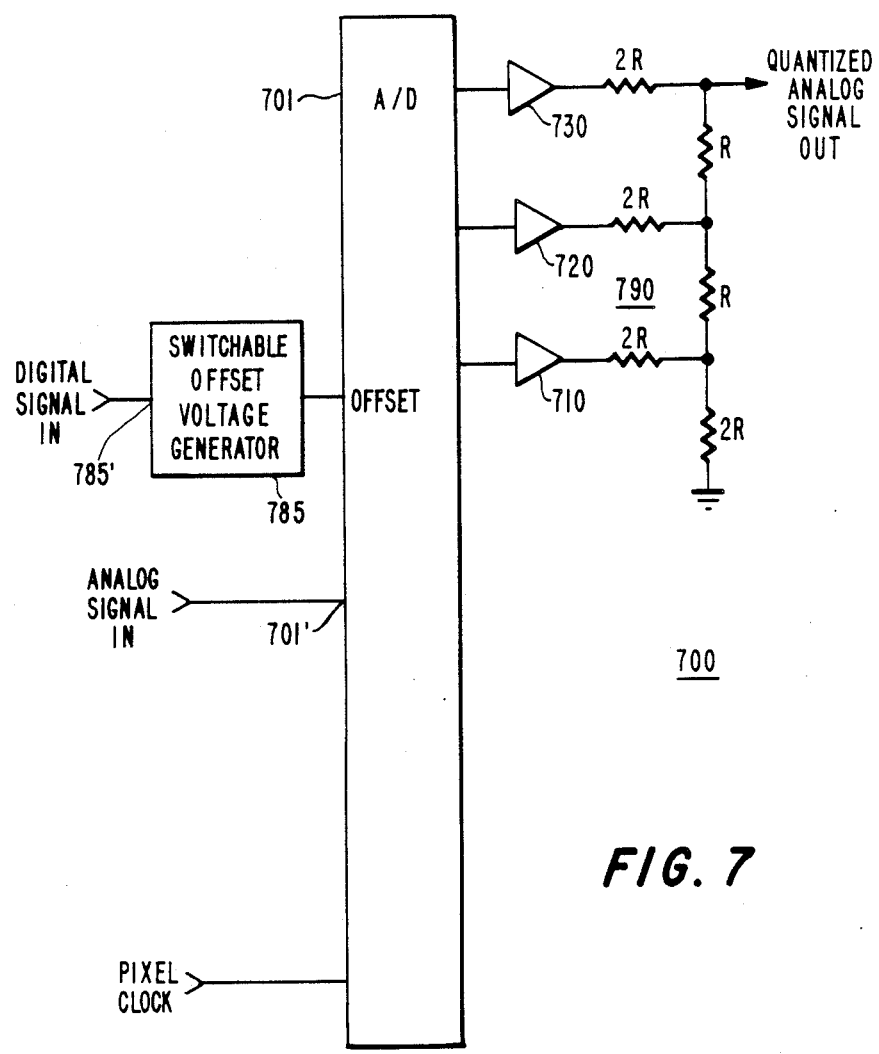
FIG. 7 illustrates, partly in block diagram form and partly in schematic form, an embodiment of an analog signal quantizer suitable for producing the quantizing ranges shown in FIGS. 1a and 1b in accordance with the invention.

FIG. 7 illustrates a 3 bit quantizer 700, having a switchable offset, suitable for producing the output levels illustrated in FIGS. 1a and 1b. Quantizer 700 comprises an A/D converter 701, a switchable offset voltage (or current) generator 785, and buffer amplifiers 710–730. An analog signal to be quantized is applied to terminal 701' of A/D converter 701, which produces at its outputs a 3 bit digital code representative of the magnitude of the input signal. Switchable offset voltage generator 785 produces a reference voltage for A/D converter 701 which is switched between first and second levels, i.e., it is offset from one level to another, in order to change the range of quantization levels. Switchable offset voltage generator 785 generates the offsetting signal in response to a digital signal applied at a control input 785'. The outputs of buffer amplifiers 710–730 are coupled to respective inputs of a binary weighted resistor ladder 790 comprising a D/A converter which combines their respective output signals to form a quantized representation of the input analog signal. Buffer amplifiers 710–730 are used to prevent loading of the outputs of A/D converter 701, and may, or may not, be needed depending upon which particular A/D converter is selected for use. The apparatus of FIG. 7 will produce a quantized signal having levels in either of two ranges, which ranges are offset from one another, in response to the level of the digital signal at terminal 785'.

Figure 8:
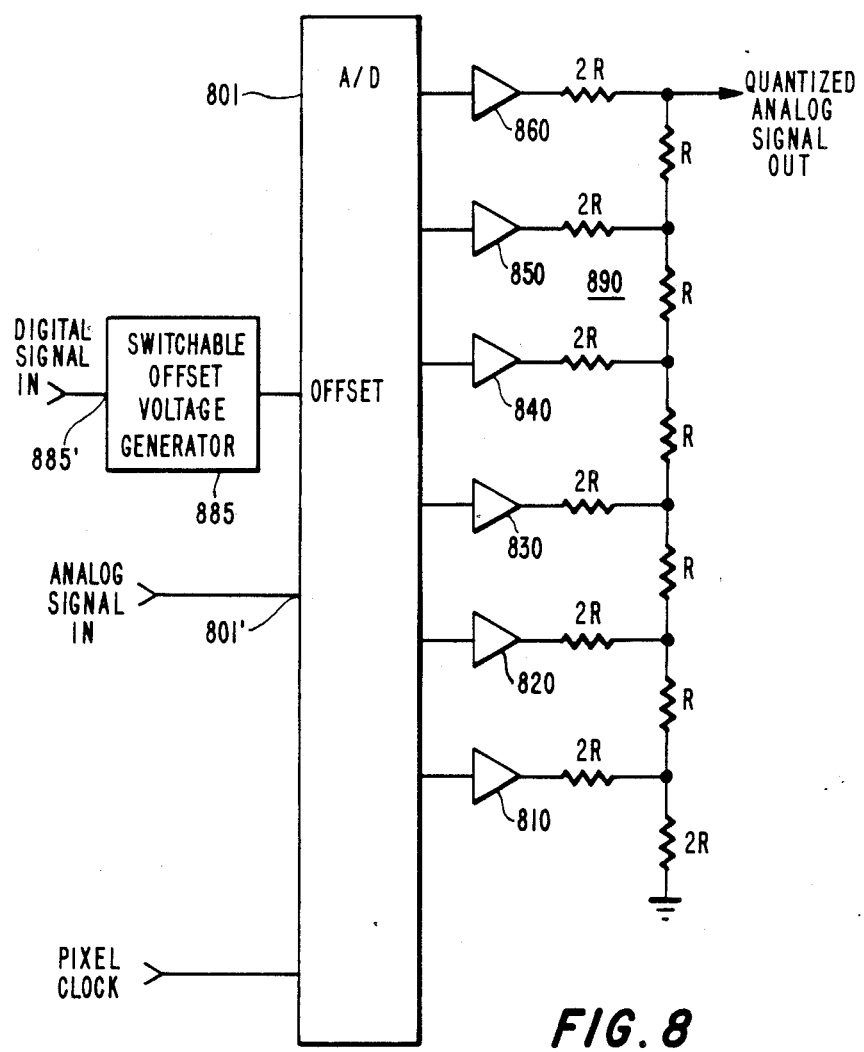
FIG. 8 illustrates, partly in block diagram form and partly in schematic form, another embodiment of an analog signal quantizer suitable for use in accordance with the invention.

Coarse quantization of grey levels for individual pixels tends to produce visible artifacts such as contouring in slowly varying regions of the image. It is therefore desirable to use a quantizer having steps that are as fine as possible. Sixty-four steps is an acceptable minimum in many applications (as opposed to the 8 steps in the above-given example described with reference to FIG. 7). A quantizer capable of producing 64 levels would perform a 6-bit A/D conversion. Such a quantizer 800 is shown in FIG. 8. Similarly numbered elements in FIGS. 7 and 8 serve similar functions.

It is noted that as the steps become finer, the quantization encoding becomes more susceptible to noise. In general, the noise must be reliably held to less than $\frac{1}{4}$ the step size used in each of the quantization functions.

It is herein recognized that a better approach would involve the quantization of coefficients obtained by image transforms. Referring to FIG. 2, a $1 \times 2$ Hadamard transform is performed on a string of successive pixels having intensities $I_1, I_2, I_3, \ldots I_n$. After being delayed and separated by a pixel multiplexing and delay unit 205, two pixels having grey level values $I_1$, and $I_2$ are produced at terminals 207 and 208, respectively, and are converted, by adder 210 and subtractor 220, into sum and difference coefficients:

$$H_{1S} = \tfrac{1}{2}(I_1 + I_2) \tag{5}$$

$$H_{1D} = \tfrac{1}{2}(I_1 - I_2) \tag{6}$$

(For simplicity the scale factor $\frac{1}{2}$ is not shown in FIG. 2.) Similarly the pixels having grey level values $I_3$ and $I_4$ are subsequently taken as a pair and converted to sum and difference signals $H_{2S}$ and $H_{2D}$. For displaying the image, one can reconstruct the original signal from the transform coefficients quite easily, since $$I_1 = H_{1S} + H_{1D} \tag{7}$$

and $$I_2 = H_{1S} - H_{1D} \tag{8}$$

In accordance with an aspect of the present invention, however, the transform coefficients are selectably quantized to discrete levels in accordance with data to be encoded, and are then recombined before transmission to form a signal approximating the original signal. Note that the original signal is not exactly duplicated since the recombined signal contains quantization errors introduced into the transform coefficients. If the quantization is done properly, the errors will not be perceptually disturbing.

FIG. 3a illustrates apparatus for encoding, quantizing and reconstructing an analog input signal using a $1 \times 2$ Hadamard transform. The "selectable" quantization is applied only to the difference coefficients (i.e., $H_{1D}$, $H_{2D}$, $H_{3D}$, etc.) and not to the sum coefficients (i.e. $H_{1S}$, $H_{2S}$, $H_{3S}$). The binary digits ($B_1, B_2 \ldots B_n$) to be encoded (i.e. embedded in the analog signal) are applied to the select control input of a selectable quantizer 300 (which may be of the type shown in FIGS. 7 and 8). As explained above, a binary one applied to the select control input causes an analog input signal to be quantized in accordance with a first set of values, while a binary zero applied to the select control input causes an analog input signal to be quantized in accordance with a second set of values.

The pixel pairs $(I_1, I_2, \ldots I_n)$ of the analog signal to be processed are successively applied to a $1 \times 2$ Hadamard transform unit 310 (which may be of the type shown in FIG. 2). The difference coefficient signal ($H_{1D}, H_{2D}, H_{3D}, \ldots H_{ND}$) output of unit 310 is coupled to the analog input terminal of selectable quantizer 300. Selectable quantizer 300 quantizes the signal and produces an output ($H_{1D}', H_{2D}', H_{3D}', \ldots H_{ND}'$) which has embedded therein digital information by virtue of its particular quantization level. Output signal ($H_{1D}', H_{2D}', H_{3D}', \ldots H_{ND}'$) is coupled to an input of a $1 \times 2$ Hadamard inverse transform unit 320. The sum signal ($H_{1S}, H_{2S}, H_{3S}, \ldots H_{NS}$) output of unit 310 is coupled directly to the other input of $1 \times 2$ Hadamard inverse transform unit 320 which performs the functions of equations 7 and 8. The sum and difference output signals produced by unit 320 are applied to a multiplexing and delay unit 330 which reconstructs a representation of the original analog signal.

The net result of the operation of the apparatus of FIG. 3a is that an analog input signal stream $I_1, I_2, I_3 \ldots I_n$ is combined with a digital input signal stream $B_1, B_2, B_3 \ldots B_n$ to form a new analog output stream $I_1', I_2', I_3' \ldots I_n'$. The analog output stream can be displayed directly on a standard television screen, and will appear perceptually quite similar to the original image.

FIG. 3b shows a suitable decoder 350 which can determine which quantization function was used for each pixel pair, and thereby decode and recover the binary signal stream that was sent along with the image information. Decoder 350 includes a multiplexing and delay unit 355, a subtractor 360, and a quantization identifier 370. Successive encoded pixels $I_1', I_2'$ are separated and delayed in unit 355 and applied in pairs to the inputs of subtractor 360 which reproduces at an output encoded Hadamard coefficients $H_{1D}', H_{2D}'$, etc., which are, in turn, successively applied to the input of quantization identifier 370 which decodes and recovers the binary data sent with the analog image information. Quantization identifier 370 may be of the type shown in FIG. 5.

Figure 4:
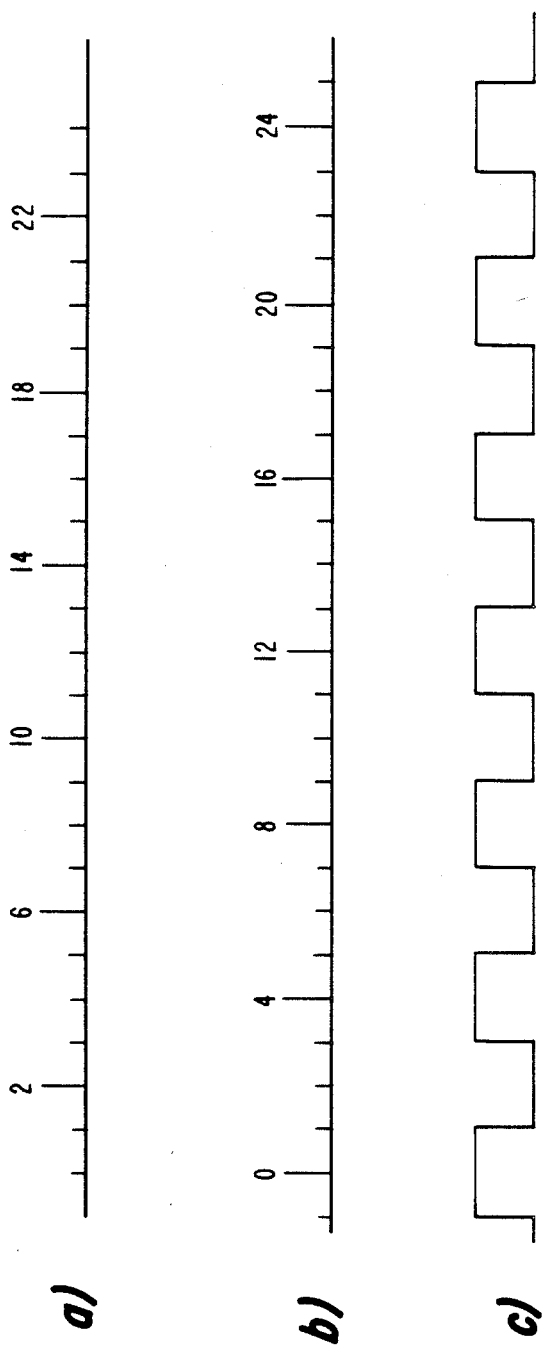
FIG. 4 illustrates in graphs (a) and (b) the possible levels of a signal quantized according to the invention, and also a decoded digital waveform (c) corresponding to these possible levels.
Figure 5:
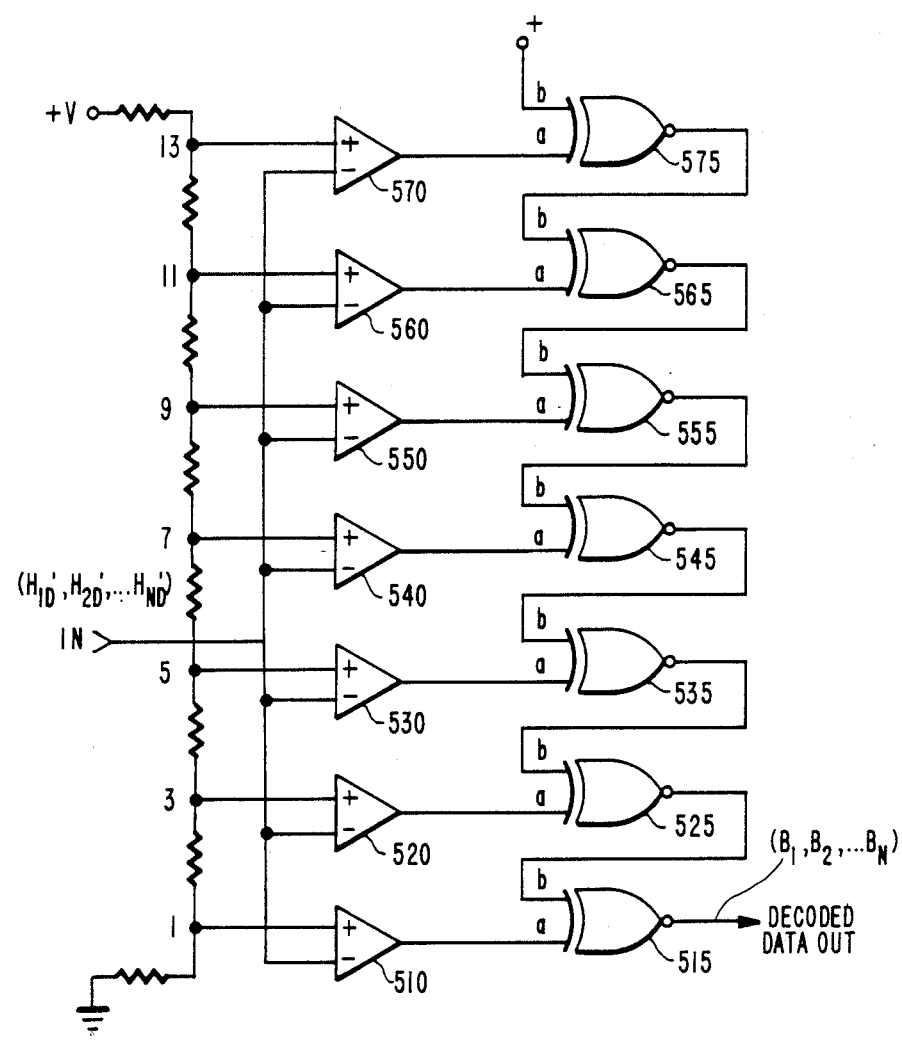
FIG. 5 illustrates, in schematic form, an embodiment of the decoder of FIG. 3b suitable for use in accordance with the invention.

Referring to FIG. 5, reconstructed encoded Hadamard coefficients ($H_{1D}', H_{2D}' \ldots$ etc.) are successively applied to the parallel-connected inverting inputs of a chain of comparators 510-570. The non-inverting inputs of comparators 510-570 are respectively coupled to individual taps of a resistive voltage divider 580 which sets the threshold levels of the respective comparators. The threshold levels are represented by the legends 1, 3, 5, 7, 9, 11 and 13 which correspond to points on graphs (a) and (b) of FIG. 4. The outputs of comparators 510-570 are coupled to respective input terminals (labelled (a)) of exclusive-nor gates 515-575. The other input terminals (labelled (B)) of exclusive-nor gates 515-565 are coupled to the output of the next higher order exclusive-nor gate. The (b) input terminal of exclusive-nor gate 575 is connected to a source of constant voltage so that it is permanently at a binary one level.

The decoder shown in FIG. 5 operates by determining if a pixel sample has one of the quantization levels possible from the two selectable quantization ranges (shown in FIGS. 1a and 1b) to determine whether the corresponding data bit should be a 1 or an 0. In operation, as the level of the input signal $H_2'$ increases, each of comparators 510-570 in turn switches to its low state. Thus, as will be explained, for a constantly increasing sequence of $H_{1D}', H_{2D}', \ldots H_{ND}'$ waveform (c) of FIG. 4 is generated at the decoded data out terminal of exclusive-nor gate 515 for the following reasons.

An exclusive-nor gate exhibits a truth table wherein unlike inputs cause a zero output, and like inputs cause a one output. Thus, when input signal ($H_{1D}', H_{2D}', \ldots H_{ND}'$) exhibits a level of zero units, the threshold level of comparator 510 is not exceeded, causing its output to be high. At this time, the signal levels at all of the outputs of exclusive-nor gates 515-575 are high (causing all of the (b) inputs of the exclusive-nor gates to be at a high (or 1) level). When the input signal ($H_{1D}', H_{2D}', \ldots H_{ND}'$) exceeds 1 unit, comparator 510 switches to a low state causing the output of exclusive-nor gate to go low (as shown in waveform (c) of FIG. 4). When the input signal level exceeds 3 units, comparator 520 switches to its low state, causing exclusive-nor gate 525 to produce a low signal, which is in turn coupled to the (b) input of exclusive-nor gate 515. A low on both inputs of exclusive-nor gate 515 causes it to produce a high-level output as shown by the rise at the point in waveform (c) corresponding to the 3 unit point on graphs (a) and (b). Note that the possible levels of quantized input signal are represented on graphs (a) and (b) by extended markers. Each of the extended markers on graph (a) corresponds with a zero level in waveform (c). Each of the extended markers on graph (b) corresponds with a one level in waveform (c). Thus, if a quantized input signal exhibits an amplitude of, for example, 4 units, then it is apparent that it was quantized with the function which produced the set of values in graph (b), and was therefore encoded with a binary one. Whereas, if a quantized input signal exhibits an amplitude of, for example, 2 units, then it is equally apparent that it was quantized with the function which produced the set of values in graph (a), and was therefore encoded with a binary zero. In this way the input signal values are "combed" into one of two classes represented by the sets of graphs (a) and (b). That is, the function of waveform (c) takes on the value binary 1 for input signal amplitudes between $-1$ and 1, 3 and 5, 7 and 9, and so on.

Figure 6:
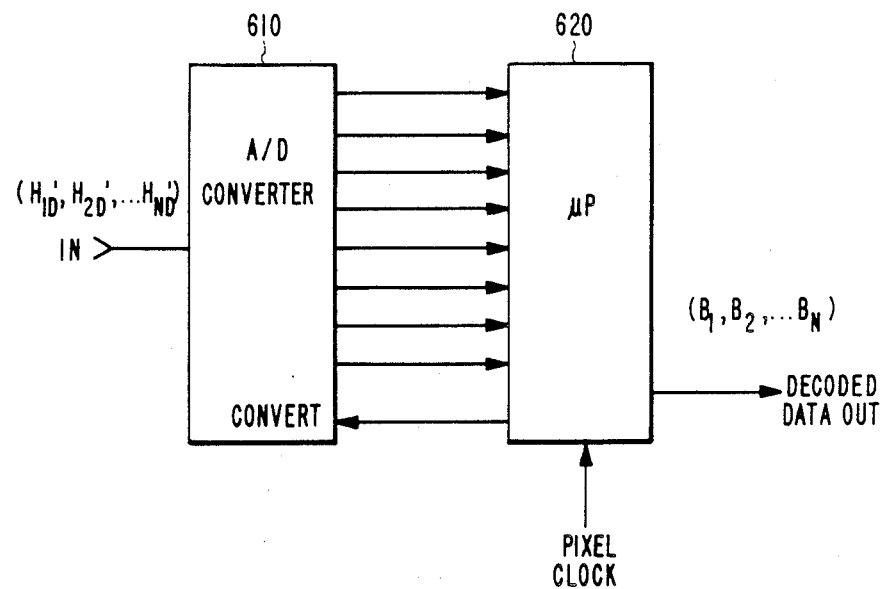
FIG. 6 illustrates in block diagram form another embodiment of the decoder of FIG. 3b suitable for use in accordance with the invention.

FIG. 6 shows another embodiment suitable for use as quantizing identifier 370 of FIG. 3b. Encoded quantized signal ($H_{1D}', H_{2D}', H_{3D}' \ldots H_{ND}'$) is applied to the analog input of an A/D converter 610. A/D converter 610 which produces a digital code representing the magnitude of the applied analog signal, in response to a convert command from a controller 620 which may be a microprocessor. Controller 620 generates the convert command in response to the timing of a pixel-related clock to ensure synchronous operation. Controller 620 then reads the data produced by A/D converter 610 and in accordance with the functions of graphs (a) and (b) of FIG. 4, produces properly decoded binary signals at the decoded data out terminal.

While this embodiment has been explained with reference to a 1×2 Hadamard transformation, the invention is not intended to be so limited. The invention may be extended to more complex image transforms. In general, any coefficient can be quantized according to two or more quantizing tables, and upon decoding, the actual table used can be discovered. Further examples include MxN Hadamard transforms, or MxN cosine transforms where M and N are the block dimensions. In general, one would expect this approach to work better using the higher frequency components since quantization errors are less noticeable in high frequencies.

Although the invention has been described with respect to an embodiment set in television system (i.e. television receiver, VCR, or videodisc) environment, it is recognized that analog signals other than television signals may be used when practicing the invention.

What is claimed is:

1. Apparatus for encoding an analog signal with a digital signal, comprising:
   quantizing means for sampling said analog signal at an input and producing a first quantized signal representative of said analog signal, said first quantized signal having a predetermined number of output levels in a first range of values, and producing a second quantized signal representative of said analog signal, said second quantized signal having a predetermined number of output levels in a second range of values, said output levels of said first range of values being offset from said output levels of said second range of values by a predetermined amount, said quantizing means having a control input and having an output at which is developed said first quantized signal or said second quantized signal in response to a control signal applied to said control input; and means for receiving said digital signal and applying said digital signal to said control input of said quantizing means as said control signal; wherein said quantizing means produces output signals having levels in said first range of values when said digital signal is in a first state, and produces output signals having levels in said second range of values when said digital signal is in a second state.

2. The apparatus of claim 1 wherein said analog signal is a video signal and said quantizing means performs said sampling of said video signal on a pixel by pixel basis.

3. The apparatus of claim 1, further comprising:

means for performing a predetermined transform upon an input signal to derive said analog signal, wherein said analog signal comprises a sequence of transform coefficients, said means for performing said predetermined transform having an input coupled to receive said input signal and having an output coupled to said input of said quantizing means for providing said analog signal thereto.

4. The apparatus of claim 3 wherein said predetermined transform is a Hadamard transform.

5. Apparatus for decoding an analog signal which has been encoded with digital data by having been selectively quantized in one of two ranges in response to the level of said digital data, comprising:

quantization identifier means having an input for receiving a quantized encoded analog input signal and an output at which is developed a bit stream corresponding to said encoded digital data; said quantization identifier recognizing which of a first quantization function and a second quantization function was applied to said received quantized analog signal, and generating a binary level occupying a first state when said first quantization function is recognized, and occupying a second state when said second quantization function is recognized.

6. The apparatus of claim 5, further comprising:

transform means having an input coupled to receive an input signal generated in response to a predetermined transform for recovering an encoded transform coefficient by performing the inverse of said predetermined transform upon said input signal to derive said analog signal, wherein said analog signal comprises a series of transform coefficients, said transform means having an output coupled to said input of said quantization identifier means for providing said analog signal thereto.

7. The apparatus of claim 6 wherein said predetermined transform is a Hadamard transform.

* * * * *